March 29, 1932. R. ANDRADE 1,851,269
INSIDE CASING CUTTER
Filed Nov. 17, 1930
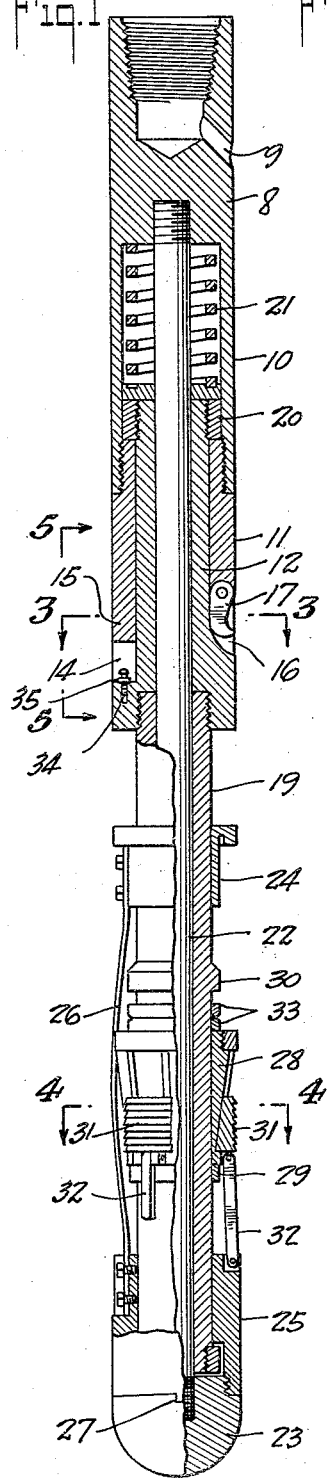
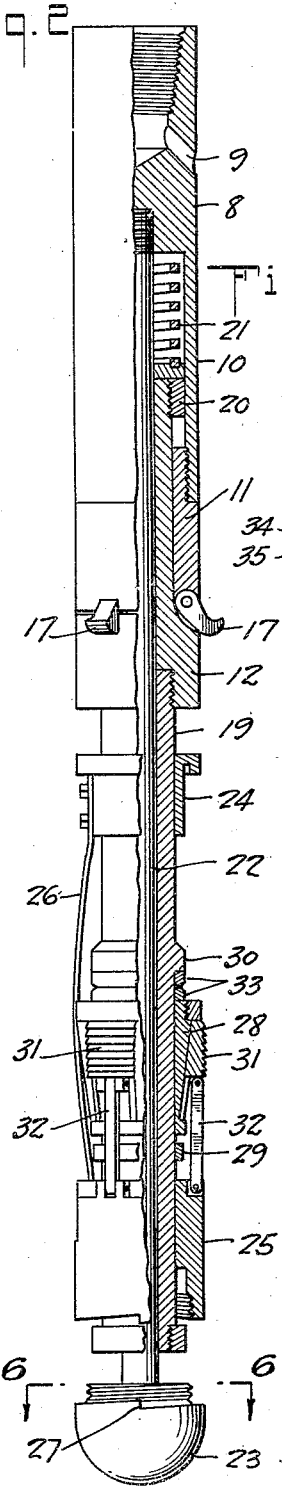
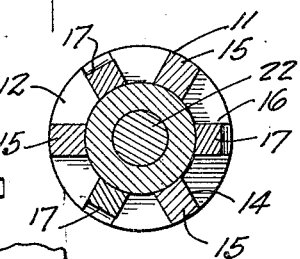
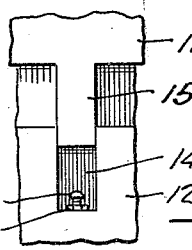
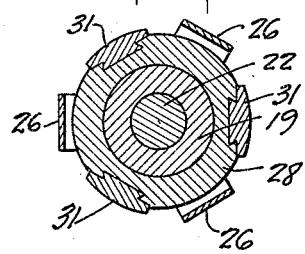
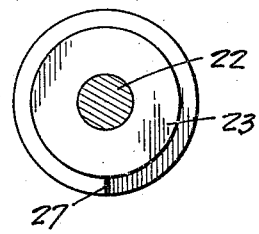
INVENTOR
Raymond Andrade
BY Westall and Wallace
ATTORNEYS Patented Mar. 29, 1932

1,851,269

UNITED STATES PATENT OFFICE

RAYMOND ANDRADE, OF COMPTON, CALIFORNIA, ASSIGNOR TO KYRAD, OF LOS ANGELES, CALIFORNIA, A CORPORATION OF CALIFORNIA

INSIDE CASING CUTTER

Application filed November 17, 1930. Serial No. 496,150.

This invention relates to a class of tools used in well drilling known as inside casing cutters and has for its principal object to simplify and improve the construction thereof.

More specifically, this invention relates to the type of casing cutter carrying a cutting blade or knife hinged on a sleeve and advanced to operative or cutting position by sliding a spreader within the sleeve, and has for another object to provide an improved means of mounting and advancing the hinged blade.

Another object of this invention is to provide a form of casing cutter which may be of small external diameter.

The object together with other objects and corresponding accomplishments are obtained by means of the embodiment of my invention illustrated in the accompanying drawings in which:

Fig. 1 is mainly an axial section of my improved casing cutter, certain parts being shown in elevation, and the cutting knives being retracted to inoperative position; Fig. 2 is a view similar to Fig. 1, the cutting knives being shown in advanced or operating position; Figs. 3 and 4 are sections on an enlarged scale as seen on the correspondingly numbered lines of Fig. 1; Fig. 5 is a detail view of one of the lugs connecting the sleeve and the mandrel; and Fig. 6 is a section on an enlarged scale as seen on line 6—6 of Fig. 2.

Referring with more particularity to the drawings, 8 indicates a "sub" internally threaded at its upper end for engagement with the end of the fishing string. A port 9 permits the circulation fluid to pass from the fishing string out into the space surrounding the tool. A skirt 10 depends from the "sub" and has a sleeve 11 secured to its lower end in any convenient manner. Slidable within sleeve 11 is a spreader mandrel 12 which is provided with recesses 14, while fingers or lugs 15 formed on the sleeve 11 are adapted to engage these recesses, thereby permitting relative axial movement of the sleeve and the mandrel but preventing relative rotary movement between them. Intermediate recesses 14 in the mandrel are formed guideways 16 and pivotally attached to sleeve 11 so as to register therewith are cutting knives 17. The guideways and knives are so arranged with respect to each other that when the sleeve is moved downward over the mandrel, the knives will be projected to cutting position (see Fig. 2).

Secured to the lower end of the mandrel 12 is an extension thereof marked 19. Secured to the top of the mandrel is a stop ring 20 adapted to engage the upper end of sleeve 11 and limit the upper movement of the sleeve along the mandrel. In the space within skirt 10 is a compression spring 21 normally holding stop ring 20 against the upper end of the sleeve. Secured to "sub" 8 and slidable within a bore through mandrel 12 and the extension mandrel 19 is the inner shaft 22, having release nut 23 secured to its lower end.

Slidable and rotatable on extension mandrel 19 are upper and lower spring followers 24 and 25, joined by bowed springs 26. The lower spring follower 25 is threadedly engaged by release nut 23, when it is not desired to project the cutting knives 17 (see Fig. 1) a stop tooth 27 being provided to prevent the threads being too tightly engaged, in a manner well understood. Also slidable and rotatable upon mandrel extension 19 between the spring followers is a slip body 28, whose longitudinal movement is limited by stop ring 29 secured to the mandrel extension and an annular shoulder 30 formed on the mandrel extension. Slidably secured to the slip body by the usual dovetail arrangement are slips 31, slip rods 32 serving to connect them to the lower spring followers. Between the annular shoulder 30 and the slip body 28 is a pair of race rings 33, which are of some wear resisting material such as hardened steel and are to prevent wear of the slip body and annular shoulder, as will be later apparent.

The casing cutter is operated in the following manner: It is lowered in the casing until the point is reached where it is desired to make a cut, and there given a few turns in a right hand direction, the spring followers, slips and connected parts being held stationary by the drag of the bowed springs on the casing. This disengages the lower spring follower 25 from the release nut 23. Shaft 22, mandrels 12 and 19, and sleeve 11 are now lowered further until annular shoulder 30 engages slip body 28 (race rings 33 of course being interposed). The bowed springs, spring followers and slips being maintained approximately stationary by the drag of the springs on the casing, further downward movement of mandrel extension 19 will force the slip body between the slips 31, the taper of the body forcing them into engagement with the casing. This prevents further downward movement of mandrels 12 and 19. The mandrels 12 and 19, shaft 22 and sleeve 11, have all been maintained in the relationship shown in Fig. 1 by spring 21. Mandrels 12 and 19 being now held against further downward movement, continued downward movement of the fishing string will compress spring 21 and move sleeve 11 downwardly relative to mandrel 12. This will force the cutting knives 17 outwardly along the guideways 16 to operative or cutting position in contact with the casing and all parts will then be as shown in Fig. 2. The tool is now rotated by means of the fishing string, knives 17 making an annular cut in the casing. As slip body 28 is maintained stationary while the mandrels and connected parts are rotated and considerable axial pressure is exerted between them, some replaceable means to take the wear, as race rings 33, are necessary. After the cut has been completed, upward movement of the fishing string will return mandrels 12 and 19 and sleeve 11 to their initial positions, and cutting knives 17 will drop back to inoperative position by their own weight. Further upward movement will move the slip body up relative the slips which will disengage them from the casing and allow the casing cutter to be moved up in the casing. Release nut 23 may be replaced in spring follower 25 if desired by a few turns of the drill string to the left. All parts are now in their original positions as shown in Fig. 1, the tool may be moved up or down, and another cut can be made in the casing at a desired point.

At the bottom of recesses 14 are set screws 34 which may be adjusted as to their projection above the bottom of the recesses and locked in position by lock nuts 35. The fingers 15 abut the screws 34 and limit the longitudinal movement of sleeve 11 with respect to mandrel 12. This movement determines the projection of the knives 17. Thus, by adjusting screws 34, the amount of projection of the knives will be determined.

What I claim is:—

1. A casing cutter comprising a sleeve, a shaft depending from said sleeve, a mandrel slidable in the sleeve and on the shaft and having cutter guide-ways, said mandrel being coupled to said sleeve against rotation, pivoted cutters carried by the sleeve and disposed in position opposing the guide-ways of said mandrel whereby the cutters coact with the surfaces of said guide-ways to cause projection of said cutters, a depending extension on said mandrel encompassing said shaft, slip mechanism slidably mounted on said extension and movable upwardly thereon to frictionally engage the casing and to effect relative longitudinal movement of said mandrel and sleeve whereby to project said cutters, said shaft and said slip mechanism having coacting means whereby to releasably lock said slip mechanism against sliding movement on said extension.

2. A casing cutter comprising a sleeve, a shaft depending from said sleeve, a mandrel slidable axially and non-rotatable in the sleeve and on the shaft and having cutter guide-ways; pivoted cutters carried by the sleeve and disposed in position opposing the guide-ways of said mandrel whereby the cutters coact with the surfaces of said guide-ways to cause projection of said cutters; a depending extension on said mandrel encompassing said shaft, a slip mechanism for causing sliding of said mandrel in said sleeve; said slip mechanism comprising a slip actuator including spaced spring followers slidably mounted on said extension, bowed springs connecting said followers; a slip body slidable on said extension and disposed intermediate the followers, there being an abutment on said extension for engagement by said slip body in its upward movement; slips riding on said slip body and coupled to said actuator, and releasable means to restrain movement of said slip mechanism in said extension.

3. A casing cutter comprising a sleeve, a shaft depending from said sleeve, a mandrel axially slidable and non-rotatable in the sleeve and on the shaft and having cutter guide-ways; pivoted cutters carried by the sleeve and disposed in position opposing the guide-ways of said mandrel whereby upon inward projection of said mandrel the cutters coact with the surfaces of said guide-ways to cause projection of said cutters; a compression spring in said sleeve acting on and tending to project said mandrel, a depending extension on said mandrel, a slip mechanism for causing sliding of said mandrel in said sleeve and shaft; said slip mechanism comprising a slip actuator including spaced spring followers slidably mounted on said extension, bowed springs connecting said followers; a slip body slidable on said extension and disposed intermediate the followers, there being an abutment on said extension for engagement by said slip body in its upward movement; slips riding on said slip body and coupled to said actuator, and releasable means at the foot of said shaft for engaging the lower follower to restrain movement of said slip mechanism on said extension.

4. A casing cutter comprising a sleeve, a shaft depending from said sleeve, a mandrel slidable in the sleeve and on the shaft and having cutter guide-ways; pivoted cutters carried by the sleeve and disposed in position opposing the guide-ways of said mandrel whereby upon inward projection of said mandrel the cutters coact with the surfaces of said guide-ways to cause projection of said cutters; a compression spring in said sleeve acting on and tending to project said mandrel, a depending extension on said mandrel encompassing said shaft, a slip mechanism for causing sliding of said mandrel in said sleeve and a release nut at the foot of said shaft; said slip mechanism comprising spaced spring followers slidably mounted on said extension, bowed springs connecting said followers; a slip body slidable on said extension and disposed intermediate the followers, there being an abutment on said extension for engagement by said slip body in its upward movement; slips riding on said slip body and coupled to one of said followers, the lower of said followers having threads for engagement with the threads of said release nut.

In witness that I claim the foregoing I have hereunto subscribed my name this 9th day of July, 1930.

RAYMOND ANDRADE.